(12) United States Patent
Bourassa et al.

(10) Patent No.: US 9,617,917 B2
(45) Date of Patent: Apr. 11, 2017

(54) FLOW CONTROL ASSEMBLY AND METHODS OF ASSEMBLING THE SAME

(71) Applicant: General Electric Company, Schenectady, NY (US)

(72) Inventors: Corey Bourassa, Niskayuna, NY (US); William Dwight Gerstler, Niskayuna, NY (US); Bruce Philip Biederman, Old Greenwich, CT (US)

(73) Assignee: General Electric Company, Niskayuna, NY (US)

( * ) Notice: Subject to any disclaimer, the term of this patent is extended or adjusted under 35 U.S.C. 154(b) by 858 days.

(21) Appl. No.: 13/955,096

(22) Filed: Jul. 31, 2013

(65) Prior Publication Data

US 2015/0033729 A1    Feb. 5, 2015

(51) Int. Cl.
*F02C 7/18*    (2006.01)
*F02C 9/16*    (2006.01)

(52) U.S. Cl.
CPC .................. *F02C 7/18* (2013.01); *F02C 9/16* (2013.01); *Y02T 50/671* (2013.01); *Y02T 50/675* (2013.01); *Y10T 29/49323* (2015.01)

(58) Field of Classification Search
CPC .... F02C 7/18; F02C 9/16; F01D 25/12; F01D 9/06; F01D 9/065
See application file for complete search history.

(56) References Cited

U.S. PATENT DOCUMENTS

| | | |
|---|---|---|
| 3,632,221 A | 1/1972 | Uehling |
| 3,742,706 A | 7/1973 | Klompas |
| 3,751,909 A | 8/1973 | Kohler |
| 3,777,489 A | 12/1973 | Johnson et al. |
| 4,291,531 A | 9/1981 | Campbell |
| 4,456,427 A | 6/1984 | Evans et al. |
| 4,791,783 A | 12/1988 | Neitzel |
| 5,117,629 A | 6/1992 | Shaw |
| 5,134,844 A | 8/1992 | Lee et al. |
| 5,155,993 A | 10/1992 | Baughman et al. |
| 5,184,459 A | 2/1993 | McAndrews |
| 5,187,931 A | 2/1993 | Taylor |

(Continued)

FOREIGN PATENT DOCUMENTS

| | | |
|---|---|---|
| GB | 2299378 A | 3/1995 |
| WO | 0238938 A1 | 5/2002 |

(Continued)

*Primary Examiner* — Woody Lee, Jr.
(74) *Attorney, Agent, or Firm* — John P. Darling

(57) ABSTRACT

A flow control assembly for controlling cooling flow of a turbine engine is provided. The flow control assembly includes a first flow control device having a first sidewall and a second sidewall. The first sidewall is coupled to a compressor vane and is configured to define a first flow path from a compressor to a turbine vane. The second sidewall is coupled to a compressor vane and is configured to define a second flow path from the compressor to a turbine blade. A second flow control device is coupled to the compressor and includes an orifice device coupled to the compressor vane and a meter device coupled to the orifice, wherein the orifice is configured to direct a cooling flow to the meter device. A controller is configured to control the meter device to facilitate regulating the cooling flow into at least one of the first flow path and the second flow path.

20 Claims, 7 Drawing Sheets

(56) References Cited

U.S. PATENT DOCUMENTS

| | | |
|---|---|---|
| 5,203,163 A | 4/1993 | Parsons |
| 5,211,003 A | 5/1993 | Samuel |
| 5,217,348 A | 6/1993 | Rup, Jr. et al. |
| 5,281,087 A | 1/1994 | Hines |
| 5,353,586 A | 10/1994 | Taylor et al. |
| 5,555,721 A | 9/1996 | Bourneuf et al. |
| 5,581,996 A | 12/1996 | Koch et al. |
| 5,871,333 A | 2/1999 | Halsey |
| 5,899,058 A | 5/1999 | Narcus et al. |
| 6,357,999 B1 | 3/2002 | Pearce et al. |
| 6,438,941 B1 | 8/2002 | Elliott et al. |
| 6,662,546 B1 | 12/2003 | Giffin |
| 7,007,488 B2 | 3/2006 | Orlando et al. |
| 7,854,112 B2 | 12/2010 | Roberge |
| 8,061,119 B2 * | 11/2011 | Agrawal ............ B64C 27/22 251/63.5 |
| 8,141,366 B2 | 3/2012 | Zamora et al. |
| 8,355,854 B2 | 1/2013 | Childers |
| 2004/0006994 A1 | 1/2004 | Walsh et al. |
| 2009/0110544 A1 * | 4/2009 | Suciu ............... F01D 5/022 415/156 |
| 2009/0145136 A1 | 6/2009 | Norris et al. |
| 2009/0175718 A1 | 7/2009 | Diaz et al. |
| 2009/0188257 A1 | 7/2009 | Kirby |
| 2009/0238683 A1 | 9/2009 | Alvanos et al. |
| 2009/0280011 A1 | 11/2009 | Tibbott |
| 2009/0317258 A1 | 12/2009 | Tibbott et al. |
| 2010/0119377 A1 | 5/2010 | Tibbott et al. |
| 2010/0124485 A1 | 5/2010 | Tibbott |
| 2010/0154433 A1 | 6/2010 | Ottaviano et al. |
| 2010/0158668 A1 | 6/2010 | Ottaviano et al. |
| 2010/0162680 A1 * | 7/2010 | Khalid ............ B64C 7/02 60/204 |
| 2010/0164234 A1 | 7/2010 | Bowman et al. |
| 2010/0223903 A1 | 9/2010 | Starr |
| 2010/0236213 A1 | 9/2010 | Schilling |
| 2010/0236256 A1 | 9/2010 | Hussain et al. |
| 2010/0303616 A1 * | 12/2010 | Chir ............... F02C 6/08 415/178 |

FOREIGN PATENT DOCUMENTS

| | | |
|---|---|---|
| WO | 2011026960 A1 | 3/2011 |
| WO | 2011075013 A1 | 6/2011 |

* cited by examiner

FLOW CONTROL ASSEMBLY AND METHODS OF ASSEMBLING THE SAME

BACKGROUND

The embodiments described herein relate generally to gas turbine engines, and more particularly, to methods and systems for extracting and controlling cooling flow from a compressor to a turbine for improving the efficiency and/or operation of the gas turbine engine.

Typically, gas turbine engines include a compressor, a combustor, and a turbine. The compressor and turbine may include rows of blades that are axially stacked in stages. Each stage includes a row of circumferentially-spaced stator blades, which are fixed, and a row of rotor blades, which rotate about a central axis or shaft. In operation, the compressor rotor blades rotate about the shaft, and, acting in concert with the stator blades, compress a flow of air. The supply of compressed air then may be used in the combustor to combust a supply of fuel. Moreover, the resulting flow of hot gases from the combustion, i.e., the working fluid, is expanded through the turbine section of the engine. Conventionally, the flow of working fluid through the turbine induces the rotor blades to rotate. The rotor blades are connected to a central shaft such that the rotation of the rotor blades rotates the shaft for work output.

More particularly, the energy contained in the fuel may be converted into the mechanical energy of the rotating shaft, which, for example, may be used to rotate the rotor blades of the compressor, such that the supply of compressed air needed for combustion is produced, and for the coils of a generator, such that electric power is generated. During operation, because of the extreme temperatures of the hot-gas path, which may exceed 2400° F. (1316° C.), and high rotational velocities, turbine blades may be highly stressed with mechanical and thermal loads. Some turbine engines may extract air from the compressor to cool components in the hot-gas path during operation. This air extraction comes at an efficiency price, however, as the usage of compressor air in this manner may decrease the efficiency of the turbine engine.

To improve gas turbine efficiency and/or reduce fuel consumption, the amount of air extracted, or bled, from the compressor should be reduced. A conventional method of reducing bleed air may include reducing the temperature of the bleed air since less air may be required to perform the same amount of cooling. To reduce the cooling air temperatures, some gas turbines may use heat exchangers such that a cooler side of the heat exchanger is in flow communication with a cooler external air stream. The addition of heat exchangers, however, may increase the cost and/or weight of the turbine engine and increase the bypass duct pressure loss which may negatively affect fuel consumption. Moreover, some gas turbines may use blade cooling techniques such as film-holes, impingement baffles and serpentine structures. These techniques, however, may add to manufacturing, operational, and/or maintenance costs.

BRIEF DESCRIPTION

In one aspect, a flow control assembly for extracting and controlling a cooling flow of a turbine engine is provided. The flow control assembly includes a compressor and a turbine, wherein the compressor has a compressor vane and the turbine has a turbine vane and a turbine blade. The flow control assembly includes a first flow control device having a first sidewall and a second sidewall. The first sidewall is coupled to the compressor vane and the turbine vane and is configured to define a first flow path from the compressor to the turbine vane. The second sidewall is coupled to the compressor vane and to the turbine blade and is configured to define a second flow path from the compressor to the turbine blade. A second flow control device is coupled to the compressor and in flow communication with the first flow control device. The second flow control device includes an orifice device coupled to the compressor vane and a meter device coupled to the orifice device, wherein the orifice device is configured to direct the cooling flow to the meter device. A controller is coupled to the second flow control device and configured to control the meter device to facilitate regulating the cooling flow into at least one of the first flow path and the second flow path.

In another aspect, a turbine engine is provided. The turbine engine includes a compressor having an exit guide vane which includes an inlet end, an outlet end and a mid-span portion located there between. A turbine is coupled to the compressor and includes a turbine vane and a turbine blade. The turbine engine includes a flow control assembly coupled to the compressor and the turbine. The control assembly includes a first flow control device having a first sidewall and a second sidewall. The first sidewall is coupled to the outlet end and the turbine vane and is configured to define a first flow path from the outlet end to the turbine vane. The second sidewall is coupled to the exit guide vane and the turbine blade and is configured to define a second low path from about the mid-span portion to the turbine blade. A second flow control device is coupled to the exit guide van and in flow communication with the first flow control device. The second flow control device includes an orifice device and a meter device, wherein the orifice device is coupled to the mid-span portion and is configured to direct a cooling flow to the meter device. The meter device is configured to meter the cooling flow into at least one of the first flow path and the second flow path.

In a further aspect, a method of assembling a flow control assembly to a turbine engine is provided. The method includes coupling a first control device to a compressor and a turbine. A first sidewall of the first flow control device is coupled to an outlet end of the compressor and to a turbine vane of the turbine. The method includes coupling a second sidewall of the first flow control device to about a mid-span portion of the compressor and to a turbine blade of the turbine. A second flow control device is coupled to the compressor and in flow communication with the first flow control device. The method further includes coupling a controller to the second flow control device.

DRAWINGS

These and other features, aspects, and advantages will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein relate to gas turbine engines and methods of assembling flow control devices to gas turbine engines. More particularly, the embodiments relate to a flow control assembly coupled to a compressor and a turbine of the gas turbine engine. The embodiments relate to methods, systems and/or apparatus for controlling compressor extraction flows during operation to facilitate improvement of engine performance. It should be understood that the embodiments described herein include a variety of types of gas and/or combustion and/or rotary engines including aircraft engines and power generating engines, and further understood that the descriptions and figures that utilize airflow control are exemplary only.

Figure 1:
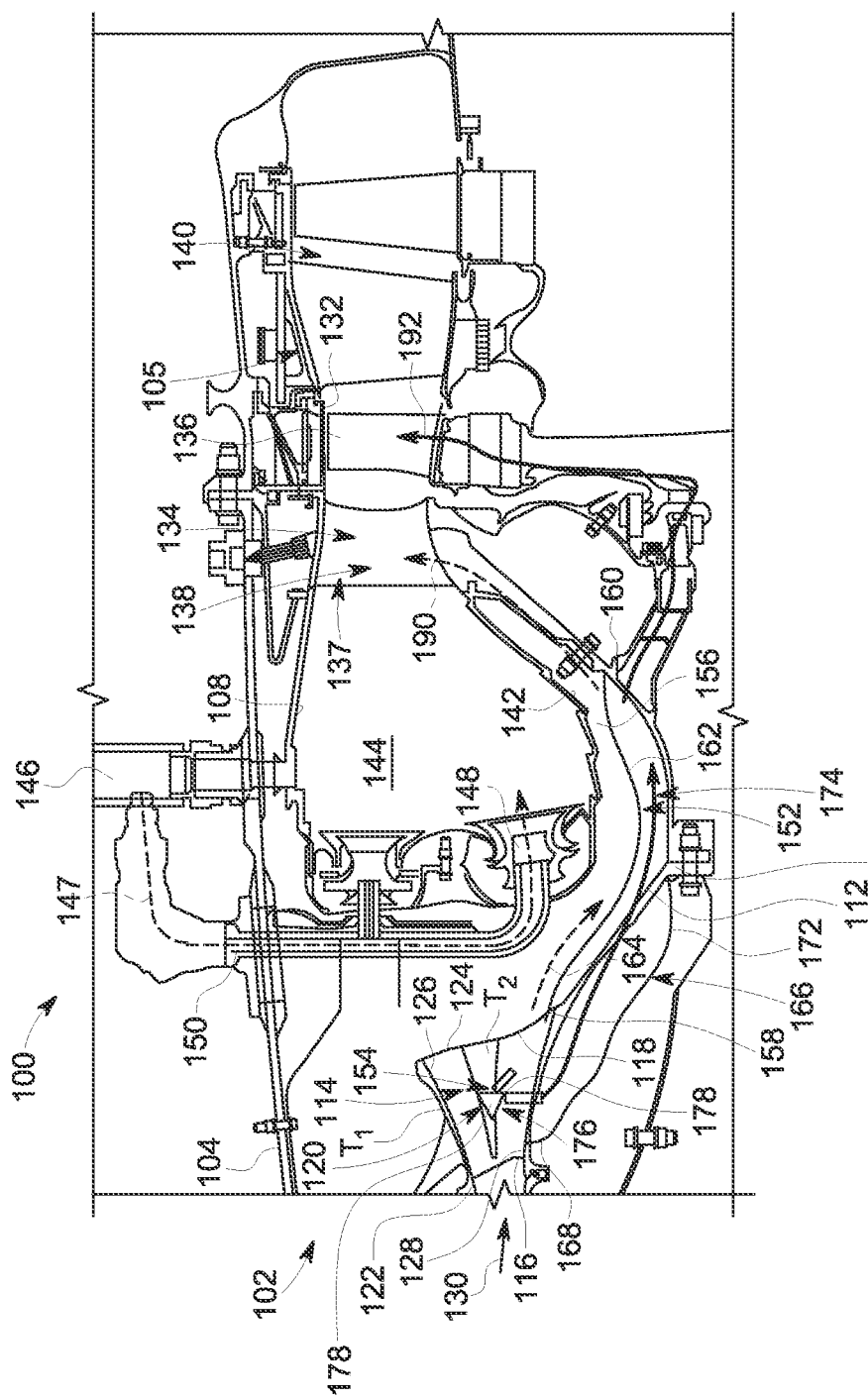
FIG. 1 is a side elevational view of an exemplary gas turbine engine and an exemplary flow control assembly coupled to the gas turbine engine.
Figure 2:
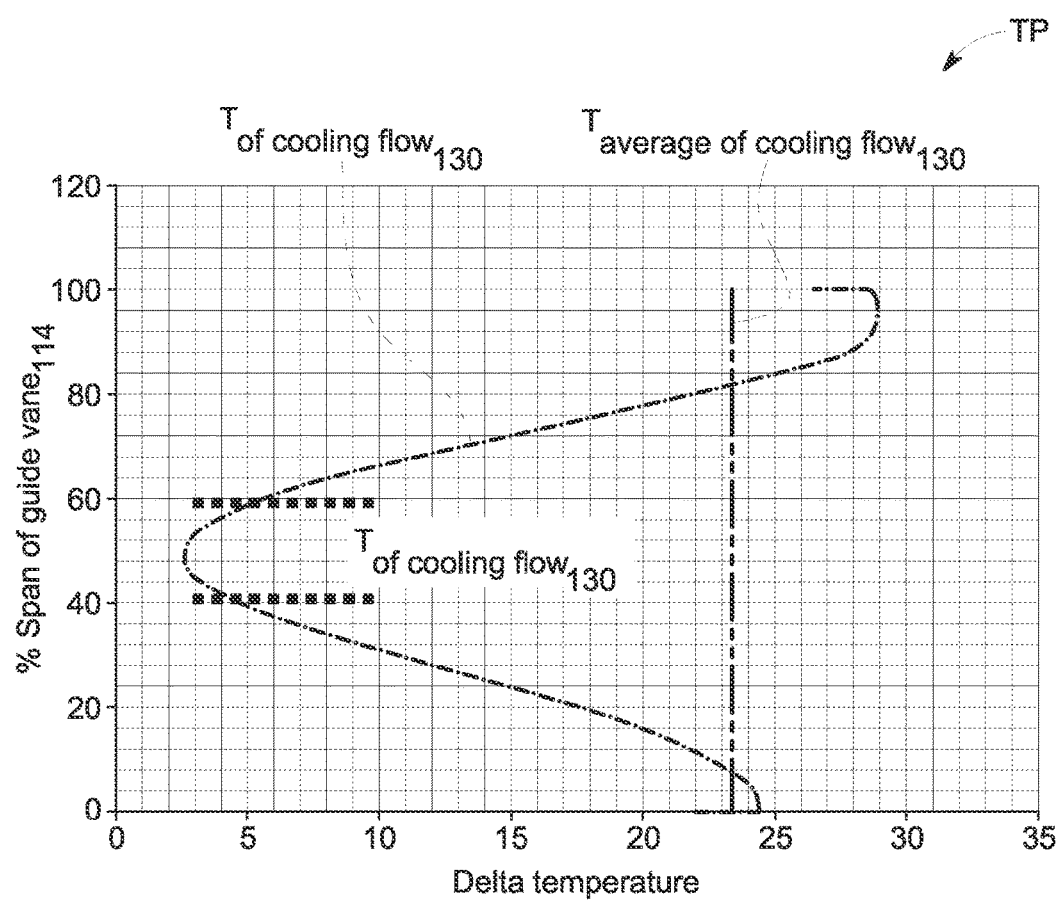
FIG. 2 is a graph illustrating an exemplary temperature profile of the gas turbine engine shown in FIG. 1.
Figure 3:
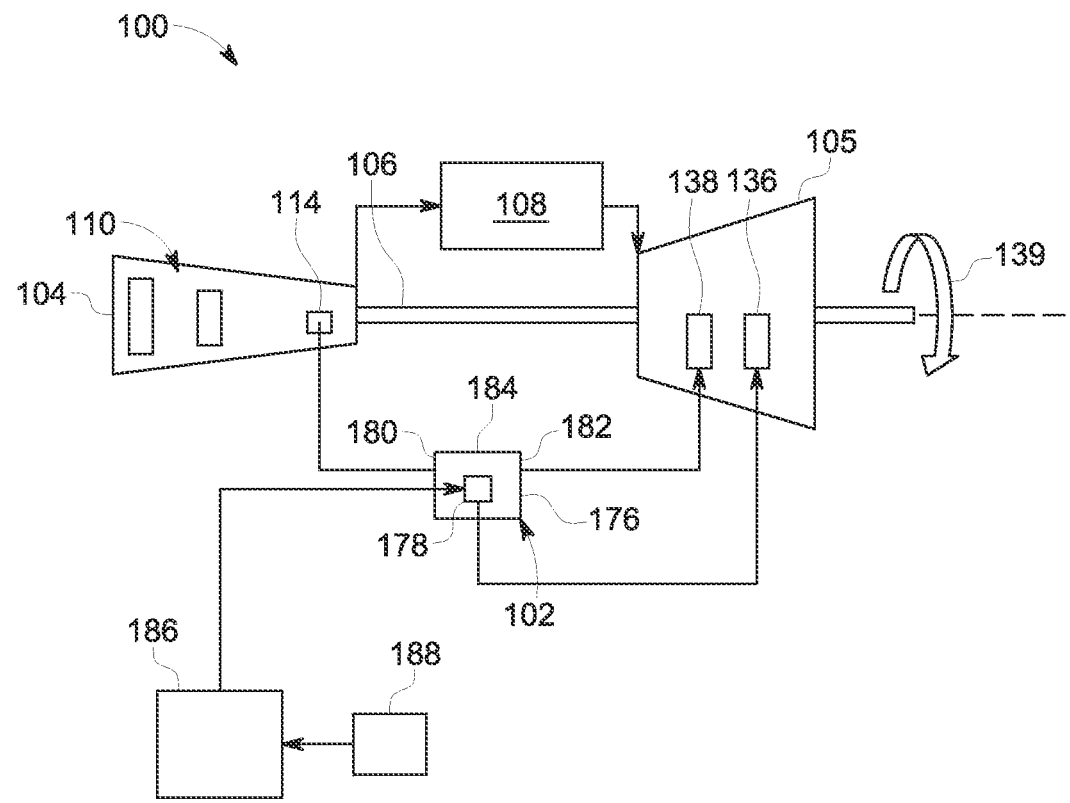
FIG. 3 is a schematic view of the gas turbine engine and the flow control assembly shown in FIG. 1.

FIG. 1 is a side elevational view of a gas turbine engine 100 and a flow control assembly 102 coupled to gas turbine engine 100. FIG. 2 is a graph illustrating an exemplary temperature profile of gas turbine engine 100. FIG. 3 is a schematic view of gas turbine engine 100 and flow control assembly 102. Engine 100 includes a compressor 104 coupled to a turbine 105 by a common shaft 106. Engine 100 further includes a combustor 108 coupled to compressor 104 and turbine 105. In the exemplary embodiment, compressor 104 includes a plurality of stages 110. Each stage 110 includes a row of compressor rotor blades (not shown), which rotate about shaft 106, followed by a row of compressor stator blades (not shown), which remain stationary during operation. Compressor rotor blades (not shown) are configured such that, when spun about the shaft 106, compressor rotor blades (not shown) impart kinetic energy to the air or fluid cooling flow flowing through compressor 104. Compressor 104 may include any number of stages 110 to enable engine 100 to function as described herein.

Compressor 104 further includes a compressor housing 112 and an exit guide vane 114 coupled to compressor housing 112. Exit guide vane 114 includes an inlet end 116, an outlet end 118 and a mid-span portion 120 located therebetween. Inlet end 116 is located at a suction side 122 of compressor 104 and outlet end 118 is located at a pressure side 124 of compressor 104. Moreover, exit guide vane 114 includes a pair of opposing end walls 126 and 128 that are coupled to and extending between inlet end 116 and outlet end 118. In the exemplary embodiment, mid-span portion 120 is located between end walls 126 and 128. Exit guide vane 114 is configured in flow communication with compressor vanes and blades (not shown) and is configured to receive a compressed cooling flow 130 such as, for example an air flow, from the compressor vanes and blades.

Cooling flow 130 enters inlet end 116, flows along exit guide vane 114 and exits outlet end 118. Cooling flow 130 has a first temperature T1 adjacent end walls 126 and 128 and a second temperature T2 within mid-span portion 120. In the exemplary embodiment, first temperature T1 is different than second temperature T2. More particularly, first temperature T1 has a higher temperature value than second temperature T2. Since cooling flow 130 is compressed as cooling flow 130 passes through compressor 104 and into exit guide vane 114, a temperature profile is hotter at end walls 126 and 128 and cooler at mid-span portion 120. In the exemplary embodiment, temperature T2 is about 0.1% to about 10% less than a peak of temperature T1. More particularly, temperature T2 is about 0.5% to about 5% less than temperature T1. In one embodiment, temperature T2 is about 5° F. (about −15° C.) to about 30° F. (about −1° C.) degrees less than temperature T1. More particularly, temperature T2 is about 10° F. (about −12° C.) degrees less than temperature T1. Alternatively, first temperature T1 may include the same temperature value as second temperature T2 or a lower temperature value than second temperature T2. First temperature T1 and second temperature T2 may include any temperature value to enable turbine engine 100 to function as described herein. FIG. 2 illustrates a graphical representation of an exemplary temperature profile TP for a change in temperature of cooling flow 130 relative to a percentage of mid-span of exit guide vane 114, as measured between end walls 126 and 128. Alternatively, temperature profile TP of cooling flow 130 can include any temperature profile within exit guide vane 114.

Turbine 105 includes a turbine housing 132 which includes a first stage 134 having a blade 136 and a vane 138. Blade 136 is configured to rotate about shaft 106 during operation, while vane 138 remains stationary during operation. Blades 136 are circumferentially spaced one from the other and fixed about an axis of rotation 139 of shaft 106. In the exemplary embodiment, blades 136 are coupled to a turbine wheel (not shown) for rotation about shaft 106. In the exemplary embodiment, blades 136 and vanes 138 lie in a hot gas path of engine 100. Turbine 105 further includes a second stage 140. Second stage 140 similarly includes a plurality of circumferentially spaced vanes 138 followed by a plurality of circumferentially spaced blades 136, which are also mounted on a turbine wheel (not shown) for rotation. Turbine 105 may include any number of stages 134, 140, blades 136 and/or vanes 138 to enable engine 100 to function as described herein.

Combustor 108 includes a combustor housing 142 coupled to compressor housing 112 and turbine housing 132. Combustor housing 142 defines a combustion chamber 144 in flow communication with compressor 104 and turbine 105. A fuel source 146 supplies a fuel 147 through supply lines 150 to an igniter 148. Supply lines 150 are configured to discharge fuel 147 into chamber 144 such that fuel 147 mixes with compressed cooling flow 130 from compressor 104. Igniter 148 is configured to combust the mix of cooling flow 130 and fuel 147. In chamber 144, energy is released when compressed medium 130 is mixed with fuel 147 and ignited. The resulting flow of hot gases from combustor 108, which may be referred to as a working fluid 137, is then directed over turbine blades 136, the flow of working fluid inducing the rotation of turbine blades 136. The energy of the flow of working fluid is transformed into the mechanical energy of rotating blades 136 and, because of the connection between rotor blades 136 and shaft 106, results in shaft rotation. The mechanical energy of shaft 106 may then be used to drive the rotation of compressor blades (not shown), such that the necessary supply of compressed air is produced, and also, for example, a generator (not shown) to produce electricity.

In the exemplary embodiment, flow control assembly 102 includes a first flow control device 152 and a second flow control device 154. First flow control device 152 is coupled to compressor housing 112 and to turbine housing 132 and includes a first sidewall 156. First sidewall 156 is coupled to exit guide vane 114 and turbine 105. First sidewall 156 includes a first end 158, a second end 160 and a body 162 located there between. More particularly, first end 158 is coupled to outlet end 118 and second end 160 is coupled to turbine housing 132. In the exemplary embodiment, body 162 is located within an area defined by compressor housing 112, turbine housing 132 and combustor housing 142. First sidewall 156 is configured to define a first flow path 164 from compressor 104 to turbine 105. More particularly, first flow path 164 is defined from outlet end 118 to turbine vane 138 wherein outlet end 118 is configured to direct cooling flow 130 toward and/or along first sidewall 156. In the exemplary embodiment, body 162 includes a curvilinear shape between first end 158 and second end 160 which facilitates directing cooling flow 130 along first flow path 164 and in flow communication with turbine vane 138. Alternatively, body 162 may include a non-curvilinear shape. Body 162 may include any shape to enable turbine engine 100 to function as described herein.

First flow control device 152 further includes a second sidewall 166. In the exemplary embodiment, second sidewall 166 includes a first end 168, a second end 170 and a body 172 located there between. Second sidewall 166 is coupled to exit guide vane 114 and turbine 105. More particularly, first end 168 is coupled to exit guide vane 114 between inlet end 116 and mid-span portion 120 and second end 170 is coupled to turbine housing 132. In the exemplary embodiment, body 172 is located between compressor housing 112 and first sidewall 156. Second sidewall 166 is configured to define a second flow path 174 from compressor 104 to turbine 105. More particularly, second flow path 174 is defined from about mid-span portion 120 to turbine blade 136. Body 172 includes a curvilinear shape between first end 168 and second end 170 which facilitates directing cooling flow 130 along second flow path 174 and in flow communication with turbine blade 136. Alternatively, body 172 may include a non-curvilinear shape. In other embodiments, body 172 includes any shape to enable turbine engine 100 to function as described herein. In the exemplary embodiment, first sidewall 156 is configured to isolate first flow path 164 from second flow path 174. Alternatively, first sidewall 156 may be configured for flow communication between first flow path 164 and second flow path 174. Moreover, first flow control device 152 may include more than first sidewall 152 and second sidewall 166 and may include more than first flow path 164 and second flow path 174. First flow control device 152 may include any number of sidewalls and flow paths to enable flow control assembly 102 to function as described herein.

Second flow control device 154 is coupled to compressor 104 and in flow communication with first flow control device 152. Second flow control device 154 includes an orifice device 176 that is coupled to exit guide vane 114. Second flow control device 154 further includes a meter device 178 coupled to orifice device 176. Orifice device 176 includes an inlet end 180, an outlet end 182 and a channel 184 of second flow control device 154. Channel 184 is coupled to and extending between inlet end 180 and outlet end 182. Orifice device 176 includes fluid receiving structures such as, but not limited to, a port, a nozzle and a snorkel. Inlet end 180 and outlet end 182 may include one or more variable geometry shapes. The geometry of each orifice device 176 may be controlled in accordance with one or more turbine operating parameters 188 of turbine engine 100.

In the exemplary embodiment, orifice device 176 is coupled to suction side 122 of exit guide vane 114. More particularly, orifice device 176 is coupled to about mid-span portion 120 of exit guide vane 114. Alternatively, orifice device 176 may be coupled to inlet end 116 and/or outlet end 118 of exit guide vane 114. Orifice device 176 may couple to or couple near any location of exit guide vane 114 to enable flow control assembly 102 to function as described herein. Orifice device 176 is configured to direct cooling flow 130 from compressor suction side 122 to meter device 178.

Meter device 178 is coupled in flow communication to orifice device 176 and to first flow path 172 and second flow path 174. In the exemplary embodiment, meter device 178 includes an actuated control valve such as, but not limited to, a pneumatic valve, and a hydraulic valve. Moreover, meter device 178 may include a variety of valves such as, but not limited to, gate valves, ball valves, butterfly valves, and solenoid valves. Meter device 178 is configured to meter cooling flow 130 to at least one of first flow path 164 and second flow path 174.

Flow control assembly 102 further includes a controller 186 coupled to second flow control device 154. In the exemplary embodiment, controller 186 is coupled to meter device 178 to facilitate controlling meter device 178 in a plurality of operating positions to facilitate regulating cooling flow 130 into at least one of first flow path 164 and second flow path 174. More particularly, controller 186 is configured to stroke positions of meter device 178 to facilitate adjusting an amount of cooling flow 130 that may flow through meter device 178. Controller 186 is configured to control the settings of meter device 178 such that these settings may be achieved by a system operator for desired performance of turbine engine 100.

Controller 186 includes a processor (not shown), such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The embodiments described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processors as described herein, process information transmitted from a plurality of electrical and electronic devices. Memory devices (not shown) and storage devices (not shown) store and transfer information and instructions to be executed by the processors. Memory devices and the storage devices can also be used to store and provide temporary variables, static (i.e., non-volatile and non-changing) information and instructions, or other intermediate information to processor during execution of instructions by the processors. The execution of sequences of instructions is not limited to any specific combination of hardware circuitry and software instructions.

In the exemplary embodiment, controller 186 includes a standard package, such as, without limitation, a gas turbine digital engine control (GT DEC) system and/or a prognosis and health monitoring (PHM) system. Controller 186 includes sufficient memory and processing resources to enable operation of gas turbine engine 100 as described herein, wherein such memory and processing resources are described above. The processor resources and memory resources form an integrated, unitary architecture that executes all algorithms and control logic and generates and transmits all data output to controller 186. Therefore, in the exemplary embodiment, only minor modifications to the architecture and programming of controller 186 to accommodate processor and data transmitted therefrom are necessary. Alternatively, controller 186 may include the architecture and programming necessary to execute the functions of the processors, thereby rendering processors unnecessary.

Controller 186 is configured to perform a plurality of functions including, for example, fuel, air and emissions control, sequencing of turbine fuel and auxiliary for start-up, shut-down and cool-down, synchronization and voltage matching of engine 100, monitoring of all turbine, control and auxiliary functions, monitoring of all turbine operating parameters 188, protection against adverse operating conditions, and/or other similar functions.

Controller 186 is further configured to provide active modulation of extraction of cooling flows 130 during operation by controlling one or more variable meter devices 178. More particularly, controller 186 is configured to control extraction of cooling flows 130 in response to one or more measured or calculated engine operating parameters 188 relating to the various components of turbine engine 100. In the exemplary embodiment, one or more operating parameters 188 relating to turbine engine 100 may be measured by controller 186 via sensors (not shown) disposed in one or more locations in turbine engine 100. Sensors may be placed throughout the various components and/or stages of turbine engine 100, including compressor 104, combustor 108, turbine 105, orifice device 176, and meter device 178, and may transmit information to controller 186 as necessary. Sensors may take measurements relating to valve positions, temperature, pressure, and other such measurements. Moreover, sensors may be used in closed loop control systems. Controller 186 is configured to monitor and record the measured information from sensors and use the obtained data from sensors to make calculations relating to operating parameters 188 that were not measured by a sensor, such as, for example, fire temperature. These calculations may be based on conventional model-based control systems or other similar methods. Controller 186 uses these calculations and the collected data to modulate extraction of cooling flows 130 to enhance turbine engine 100 operation.

In the exemplary embodiment, operating parameters 188 measured, monitored, and recorded by controller 186 include, but are not limited to: turbine exhaust temperature and/or pressure, compressor airflow, compressor inlet temperature, compressor outlet temperatures, compressor inlet pressure, compressor outlet pressure, fuel flow, combustion dynamics, distribution and intake air-flow. Controller 186 is configured to calculate, monitor, and record one or more operating parameters 188 e.g., without limitation, combustor exit temperature, turbine reference temperature, turbine firing temperature, based on measured engine operating parameters 188. Controller 186 facilitates adjusting meter device 178 pursuant to any and all of these measured, monitored, recorded, and/or calculated engine operating parameters 188, i.e., data concerning how the engine 100 is operating and the conditions under which it operates.

During an exemplary operation, flow control assembly 102 is configured to extract cooling flow 130 from at least mid-span portion 120 of exit guide vane 114 to facilitate cooling at least one of turbine vane 138 and turbine blade 136. More particularly, rotation of compressor blades (not shown) within compressor 104 compresses cooling flow 130 and discharges cooling flow 130 to exit guide vane 114. Inlet end 116 is configured to receive compressed cooling flow 130 and direct toward mid-span portion 120. Cooling flow 130 flows into mid-span portion 120 and a first cooling flow 190 of cooling flow 130 continues to flow beyond mid-span portion 120 and discharges from outlet end 118. Outlet end 118 is configured to direct first cooling flow 190 into first flow path 164. First flow path 164 is configured to direct first cooling flow 190 between combustor housing 142 and turbine housing 132 and in flow communication with turbine vane 138. First cooling flow 190 is configured to facilitate cooling turbine vane 138. In the exemplary embodiment, first flow path 164 is sized and shaped to locally diffuse first cooling flow 190 to facilitate increasing local static pressure beyond exit guide vane 114 to provide sufficient pressure within first flow path 164 for cooling turbine vane 138.

As cooling flow 130 flows into mid-span portion 120, orifice device 176 is configured to receive cooling flow 130 and direct a second cooling flow 192 of cooling flow 130 into meter device 178. By extracting second cooling flow 192 from mid-span portion 120 to meter device 178, second cooling flow 192 includes second temperature T2 which has a lower temperature value than first temperature T1 at end walls 126 and 128 and/or lower temperature value than a bulk average temperature of exit guide vane 114. Moreover, a temperature migration from lower temperature to higher temperature cooling flow exists from suction side 122 to pressure side 124 to facilitate additional temperature reduction for second cooling flow 192.

Meter device 178 is configured to direct at least a portion of second cooling flow 192 into second flow path 174. Second flow path 174 is configured to direct second cooling flow 192 between first sidewall 156 and turbine housing 132 and in flow communication with turbine blades 136. Second cooling flow 192 is configured to facilitate cooling turbine blade 136. In the exemplary embodiment, second flow path 174 is sized and shaped to locally diffuse second cooling flow 192 to facilitate increasing local static pressure beyond exit guide vane 114 to provide sufficient pressure within second flow path 174 for cooling turbine blade 136.

Meter device 178 is configured to meter cooling flow 130 that is extracted from mid-span portion 120 for cooling turbine blade 136 by adjusting flow of second cooling flow 192. In one embodiment, the amount of metered/extracted second cooling flow 192 may be or may not be dependent on engine speed. For example, a larger flow area is desired for aircraft take-off conditions to extract a larger quantity of air. The larger amount of air, however, may be too large at a cruise condition. By adjusting meter device 178, a preferred amount of cooling air that is required for operations may be delivered to turbine 105.

During an exemplary operation, meter device 178 is electronically controlled by controller 186. In an exemplary mode, controller 186 adjusts meter device 178 to direct cooling flow 130 as first cooling flow 190 into first flow path 164 to facilitate cooling turbine vane 138. In another exemplary mode, controller 186 adjusts meter device 178 to direct cooling flow 130 as second cooling flow 192 into second flow path 174 to facilitate cooling turbine blade 136. Still further, in another exemplary mode, controller 186 adjusts meter device 178 to direct cooling flow 130 as first cooling flow 190 into first flow path 164 to facilitate cooling turbine vane 138 and as second cooling flow 192 into second flow path 174 to facilitate cooling turbine blade 136.

Figure 4:
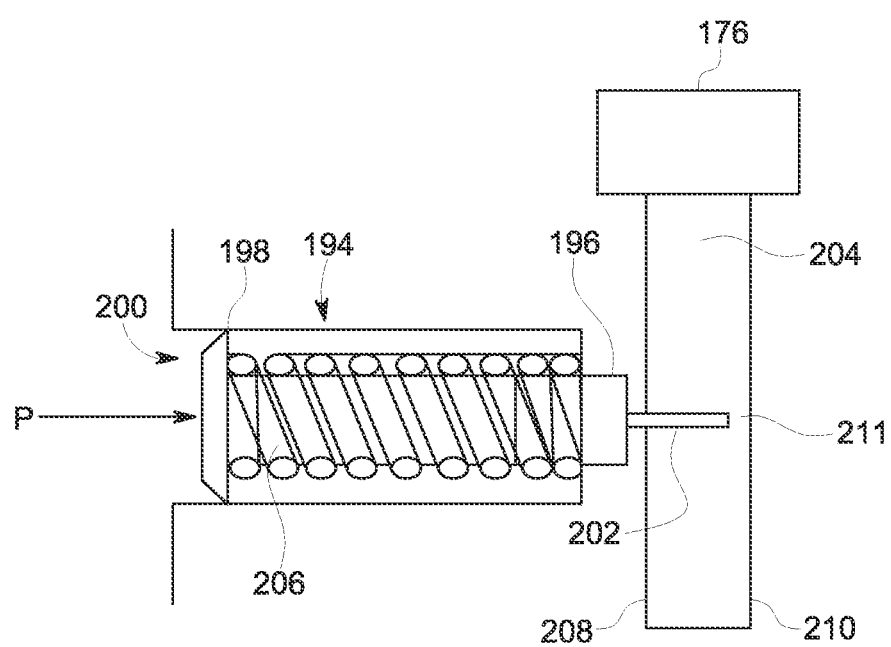
FIG. 4 is a schematic view of an exemplary meter device that may be used with the flow control assembly shown in FIG. 1.

FIG. 4 is a schematic view of an exemplary meter device 194 of flow control assembly 102 shown in FIG. 1. Meter device 194 is coupled in flow communication to orifice device 176. In the exemplary embodiment, meter device 194 includes a control actuated valve 196. More particularly, meter device 194 includes a housing 198, a bias member 200, a plunger 202 and a flow passage 204. Bias member 200 is coupled to housing 198 and to plunger 202. Plunger 202 is coupled to flow passage 204, which is coupled in flow communication with orifice device 176.

Bias member 200 includes a spring 206 having a first position within housing 198 when acted upon by a force, such as gas pressure P, and a second position within housing 198 when acted upon by another force, such as a spring constant force. Plunger 202 is coupled to spring 206 and positioned within flow passage 204. In the exemplary embodiment, plunger 202 is configured to reciprocate between a first wall 208 and a second wall 210 of flow passage 204.

In first position, gas pressure P forces spring 206 toward flow passage 204. Plunger 202 moves within flow passage 204 from first wall 208 toward second wall 210. In second position, spring constant force moves spring 206 away from flow passage 204. Plunger 202 moves within flow passage 204 from second wall 210 to first wall 208. As gas pressure P changes, the movement of plunger 202 back and forth within flow passage 204 defines an adjustable opening 211. In the exemplary embodiment, adjustable opening 211 is configured to meter cooling flow 130 from orifice device 176 and through flow passage 204.

Figure 5:
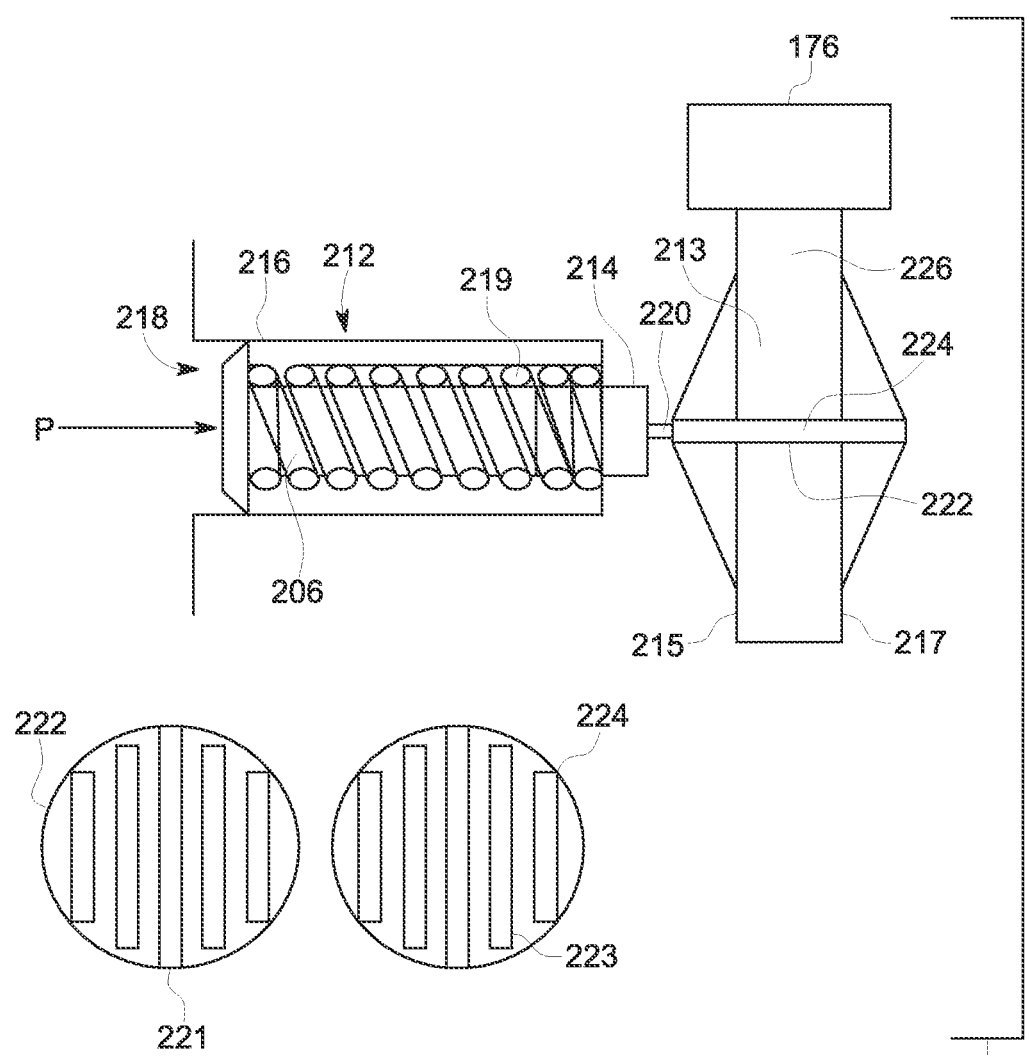
FIG. 5 is a schematic view of another exemplary meter device that may be used with the flow control assembly shown in FIG. 1.

FIG. 5 is a schematic view of another exemplary meter device 212 of the flow control assembly 102 shown in FIG. 1. Meter device 212 is coupled in flow communication to orifice device 176. In the exemplary embodiment, meter device 212 includes a control actuated valve 214. More particularly, meter device 212 includes a housing 216, a bias member 218, a plunger 220, a first orifice plate 222, a second orifice plate 224, and a flow passage 226. Moreover, bias member 218 is coupled to housing 216 and to plunger 220. Plunger 220 is coupled to first orifice plate 222. In the exemplary embodiment, second orifice plate 224 is coupled to flow passage 226 which is coupled in flow communication to orifice device 176. First orifice plate 222 includes a first plurality of slits 221 defined there through and second orifice plate 224 includes a plurality of second slits 223 defined there through. Slits 221 and slits 223 include openings having a plurality of shapes such as, but not limited to, elongated openings, circular openings, diamond shaped openings Different geometries of slits 221 and 223 facilitate producing a plurality of ranges of opening percentages relative to first orifice plate 22 and second orifice plate 224.

Bias member 218 includes a spring 219 having a first position within housing 216 when acted upon by a force, such as gas pressure P, and a second position within housing 216 when acted upon by another force, such as a spring constant force. First orifice plate 222 is coupled to spring 219 and positioned within flow passage 226. In the exemplary embodiment, first orifice plate 222 is configured to reciprocate between a first wall 215 and a second wall 217 of flow passage 226.

In the first position, gas pressure P forces spring 219 toward flow passage 226. Plunger 220 moves first orifice plate 222 within flow passage 226 from first wall 215 toward second wall 217. In the second position, spring constant force moves spring 219 away from flow passage 226 in the second position. Plunger 220 moves first orifice plate 222 within flow passage 226 from second wall 217 toward first wall 215. More particularly, first orifice plate 222 moves within flow passage 226 and relative to second orifice plate 224. The movement of first orifice plate 222 back and forth within flow passage 226 and relative to second orifice plate 224 is configured to move the first plurality of slits 221 relative to the second plurality of slits 223. As gas pressure P changes, the movement of the first plurality of slits 221 relative to the second plurality of slits 223 defines an adjustable opening 213. In the exemplary embodiment, adjustable opening 213 is configured to meter cooling flow 130 from orifice device 176 and through flow passage 226.

Figure 6:
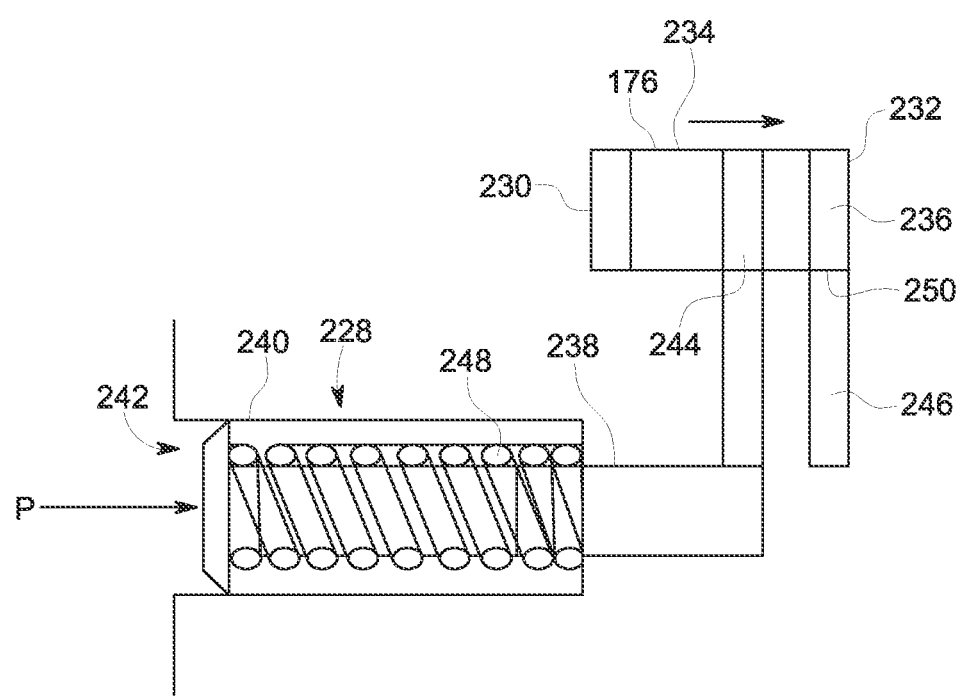
FIG. 6 is a schematic view of another exemplary meter device that may be used with the flow control assembly shown in FIG. 1.

FIG. 6 is a schematic view of another exemplary meter device 228 of flow control assembly 102 shown in FIG. 1. Meter device 228 is coupled in flow communication to orifice device 176. Orifice device 176 includes an inlet 230, an outlet 232 and a channel 234 located between inlet 230 and outlet 232. Channel 234 further includes an opening 236 coupled in flow communication to a flow passage 246. Meter device 228 includes a control actuated valve 238. More particularly, meter device 228 includes a housing 240, a bias member 242 and a modulating block 244. Bias member 242 is coupled to housing 240 and to modulating block 244. Modulating block 244 is coupled to channel 234 and in flow communication with flow channel 234.

Bias member 242 includes a spring 248 having a first position within housing 240 when acted upon by a force, such as gas pressure P, and a second position within housing 240 when acted upon by another force, such as a spring constant force. Modulating block 244 is coupled to spring 248 and positioned within channel 234. In the exemplary embodiment, modulating block 244 is configured to reciprocate within channel 234.

In the first position, gas pressure P forces spring 248 toward flow passage 246. Modulating block 244 moves within channel 234 toward flow passage 246. In the second position, spring constant force moves spring 248 away from flow passage 246. Modulating block 244 moves within channel 234 and away from flow passage 246. Moreover, modulating block 244 moves within channel 234 toward flow passage 246 to expose opening 236 in flow communication with flow channel 234. In the exemplary embodiment, modulating block 244 moves within channel 234 and away from flow passage 246 to block opening 236 from flow channel 234. As gas pressure P changes, the movement of modulating block 244 back and forth within channel 234 defines an adjustable opening 250. In the exemplary embodiment, adjustable opening 250 is configured to meter cooling flow 130 from orifice device 176 and through flow passage 246.

Figure 7:
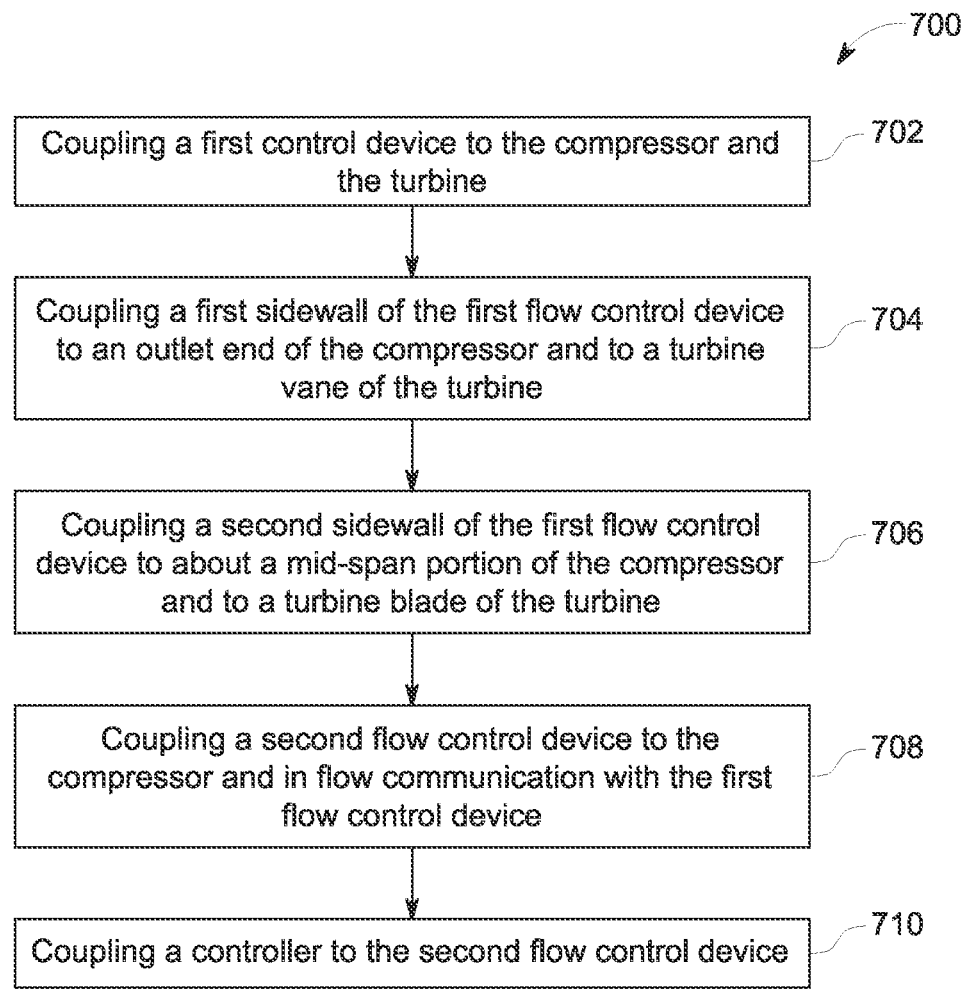
FIG. 7 is a flowchart illustrating an exemplary method of assembling the flow control assembly, shown in FIG. 1.

FIG. 7 is an exemplary flowchart illustrating a method 700 of assembling a flow control assembly, such as flow control assembly 102 (shown in FIG. 1), to a turbine engine, for example turbine engine 100 (shown in FIG. 1). Turbine engine includes a compressor, for example compressor 104 (shown in FIG. 1), and a turbine, for example turbine 105 (shown in FIG. 1). Method 700 includes coupling 702 a first flow control device, such as first flow control device 152 (shown in FIG. 1), to the compressor and the turbine. More particularly, method 700 includes coupling 704 a first sidewall, for example first sidewall 156 (shown in FIG. 1), of the flow control device to an outlet end, for example outlet end 118 (shown in FIG. 1), to the compressor and to a turbine vane, such as turbine vane 138 (shown in FIG. 1), of the turbine.

Method 700 further includes coupling 706 a second sidewall, such as second sidewall 166 (shown in FIG. 1), of the first flow control device to a mid-span portion, for example mid-span portion 120 (shown in FIG. 1), of the compressor. Method 700 also include coupling the second sidewall to a turbine blade, for example turbine blade 136 (shown in FIG. 1), of the turbine. In the exemplary method 700, a second flow control device, such as second flow control device 174 (shown in FIG. 1), is coupled 608 to the compressor and in flow communication with the first flow control device 152. Method 700 includes coupling 710 a controller, for example controller 186 (shown in FIG. 3), to the second flow control device.

In the exemplary method 700, coupling the second control device includes coupling an orifice, for example orifice device 176 (shown in FIG. 1), to the mid-span portion of the compressor. Moreover, in the exemplary method 700, coupling the second control device includes coupling a meter device, for example meter device 178 (shown in FIG. 1) to the mid-span portion and in flow communication with the first flow control device 152. Moreover, method 700 includes coupling the meter device in flow communication to the first sidewall and coupling the meter device in flow communication to the second sidewall.

A technical effect of the systems and methods described herein includes at least one of: (a) extracting air flow from a mid-span portion of a compressor vane of a gas turbine engine; (b) controlling the level of extracted air to a turbine blade; (c) directing the extracted air to the turbine blade; (d) cooling the turbine blade with the extracted air; (e) maintaining desired temperatures of the turbine blade; and (f) increasing efficiency and reducing fuel consumption of the gas turbine engine.

The exemplary embodiments described herein extract and control temperature profiles which are cooler in the radial center, for example mid-span, of the cooling flow relative to hotter flow at end walls of the vane guide. Extracting cooling air from the mid-span of the flow, as opposed to near the end-walls or after the compressor air exits and low and high temperature air mixes, lower temperature cooling air can be supplied to the turbine without the need for a heat exchanger. Implementing a mid-span extraction bleed port in a compressor exit guide vane facilitates providing lower temperature cooling air to the turbine.

The exemplary embodiments described herein facilitate increasing efficiency and reducing fuel consumption for a gas turbine engine. More particularly, the exemplary embodiments are configured to use a lower temperature bleed air that is extracted from the compressor and directed to cool turbine components. Moreover, the embodiments described herein use a lesser amount of bleed air to cool turbine components which increases a firing temperature of the combustor. Still further, the exemplary embodiments increase efficiency and reduce operating and maintenance costs associated with the turbine engine.

Compressor extraction may be provided in any compressor stage of a turbine system. The extracted flow may be supplied to the turbine section of the engine to cool parts and/or maintain the parts at appropriate temperatures during operation. For the embodiments described herein, extracted flow includes fluid medium such as, for example, air that is extracted or bled from the compressor and fed to the turbine section of the engine to cool parts, purge cavities or other similar uses. Orifice is configured to control the level of extracted air to maintain operating characteristics. Orifice may be operated to define at least a relatively low flow orifice setting, a high flow orifice setting and/or other settings. In the embodiments described herein, controller is configured to control and manipulate extraction flows existing multi-parameter turbine engine control system (e.g., existing model-based control systems or corrected parameter control systems) and/or for new turbine engine control systems.

The embodiments described herein utilize variable compressor extraction control and model-based control for improving operation of a combustion or gas turbine engine. Variable compressor extraction includes the ability to control the amount of airflow being extracted from the compressor section of a gas turbine. Model-based control includes a method of controlling a turbine engine based upon a model of engine operation. As such, a turbine engine may be controlled not only on measured operating parameters, but also on operating parameters that may be calculated given the turbine engine model and the measured operating parameters. The embodiments described herein enhance operational performance through, among other things, the integration of variable compressor extraction and model-based control.

Exemplary embodiments of a flow control device and turbine engine and methods for assembling the flow control device are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment may be implemented and utilized in connection with many other engine applications.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flow control assembly for controlling a cooling flow of a turbine engine having a compressor and a turbine, the compressor having an exit guide vane and the turbine having a turbine vane and a turbine blade, said flow control assembly comprising:
   a first flow control device comprising a first sidewall and a second sidewall, said first sidewall coupled to the exit guide vane and the turbine vane and configured to define a first flow path from the compressor to the turbine vane, said second sidewall coupled to the exit guide vane and to the turbine blade and configured to define a second flow path from the compressor to the turbine blade;
   a second flow control device coupled to the exit guide vane and in flow communication with said first flow control device, said second flow control device comprising an orifice device coupled to the exit guide vane and a meter device coupled to said orifice device, said orifice device configured to direct the cooling flow to said meter device; and
   a controller coupled to said second flow control device and configured to control said meter device to facilitate regulating the cooling flow into at least one of said first flow path and said second flow path.

2. The flow control assembly of claim 1, wherein said first sidewall is configured to isolate said first flow path from said second flow path.

3. The flow control assembly of claim 1, wherein said orifice device is coupled to a suction side of the exit guide vane.

4. The flow control assembly of claim 1, wherein said orifice device is coupled to a mid-span portion of the exit guide vane.

5. The flow control assembly of claim 1, wherein said orifice device is coupled to an inlet end of the exit guide vane.

6. The flow control assembly of claim 1, wherein said orifice device comprises at least one of a port, a nozzle and a snorkel.

7. The flow control assembly of claim 1, wherein said meter device comprises a pneumatic valve comprising:
   a bias member; and
   an orifice plate coupled to said bias member.

8. The flow control assembly of claim 1, wherein said controller is configured to control said meter device to meter the cooling flow into said first flow path.

9. The flow control assembly of claim 1, wherein said controller is configured to control said meter device to meter the cooling flow into said second flow path.

10. The flow control assembly of claim 1, wherein said controller is configured to control said meter device to meter the cooling flow into said first flow path and said second flow path.

11. A turbine engine comprising:
   a compressor comprising an exit guide vane, said exit guide vane comprising an inlet end, an outlet end and a mid-span portion located therebetween;
   a turbine coupled to said compressor and comprising a turbine vane and a turbine blade; and
   a flow control assembly coupled to said compressor and said turbine, said control assembly comprising:
   a first flow control device comprising a first sidewall and a second sidewall, said first sidewall coupled to said outlet end and said turbine vane and configured to define a first flow path from said outlet end to said turbine vane, said second sidewall coupled to said exit guide vane and said turbine blade and configured to define a second low path from about said mid-span portion to said turbine blade; and
   a second flow control device coupled to said exit guide vane and in flow communication with said first flow control device, said second flow control device comprising an orifice device and a meter device, said orifice device coupled to said mid-span portion and configured to direct a cooling flow to said meter device and said meter device configured to meter said cooling flow into at least one of said first flow path and said second flow path.

12. The turbine engine of claim 11, further comprising a combustor and said first sidewall is positioned between said combustor and said compressor.

13. The turbine engine of claim 11, wherein said first sidewall is configured to isolate said first flow path from said second flow path.

14. The turbine engine of claim 11, wherein said second sidewall is coupled to said exit guide vane between said inlet end and said mid-span portion.

15. The turbine engine of claim 11, wherein said exit guide vane comprises a first end wall and a second end wall and said mid-span portion is located therebetween.

16. A method of assembling a flow control assembly to a turbine engine comprising a compressor and a turbine, said method comprising:
   coupling a first control device to an exit guide vane of the compressor and the turbine;
   coupling a first sidewall of the first flow control device to an outlet end of exit guide vane and to a turbine vane of the turbine;
   coupling a second sidewall of the first flow control device to about a mid-span portion of the exit guide vane and to a turbine blade of the turbine;
   coupling a second flow control device comprising an orifice device to the exit guide vane and in flow communication with the first flow control device; and
   coupling a controller to the second flow control device to control a cooling flow into the flow control assembly.

17. The method of claim 16, wherein coupling the second flow control device comprises coupling the orifice device to a mid-span portion of the exit guide vane.

18. The method of claim 16, wherein coupling the second flow control device further comprises coupling a meter device to a mid-span portion of the exit guide vane and in flow communication to the first flow control device.

19. The method of claim 16, wherein coupling the second flow control device further comprises coupling a meter device in flow communication to the first sidewall.

20. The method of claim 16, wherein coupling the second flow control device further comprises coupling a meter device in flow communication to the second sidewall.

* * * * *